United States Patent [19]

Reid et al.

[11] 4,292,670
[45] Sep. 29, 1981

[54] DIAGNOSIS OF ENGINE POWER AND COMPRESSION BALANCE

[75] Inventors: David L. Reid; Dennis O. Taylor, both of Columbus, Ind.

[73] Assignee: Cummins Engine Company, Inc., Columbus, Ind.

[21] Appl. No.: 47,066

[22] Filed: Jun. 11, 1979

[51] Int. Cl.³ ........................................... G01M 15/00
[52] U.S. Cl. ................................... 364/431; 364/511; 364/551; 73/116
[58] Field of Search .................... 364/551, 431, 511; 73/118, 116, 119 A, 119 R

[56] References Cited

U.S. PATENT DOCUMENTS

| | | | |
|---|---|---|---|
| 3,750,465 | 8/1973 | Howell et al. | 364/431 X |
| 4,046,003 | 9/1977 | Armstrong et al. | 364/431 X |
| 4,050,296 | 9/1977 | Benedict | 73/116 |
| 4,061,025 | 12/1977 | Willenbecher et al. | 73/116 |
| 4,088,109 | 5/1978 | Woodruff et al. | 364/431 X |
| 4,128,005 | 12/1978 | Arnston et al. | 364/431 X |
| 4,140,087 | 2/1979 | Daumer et al. | 364/431 X |
| 4,141,242 | 2/1979 | Scott | 73/119 A X |
| 4,179,922 | 12/1979 | Bouverie et al. | 73/116 |

*Primary Examiner*—Edward J. Wise
*Attorney, Agent, or Firm*—Merriam, Marshall & Bicknell

[57] ABSTRACT

This disclosure relates to a system for analyzing the performance of a reciprocating piston, internal combustion engine such as a diesel engine. Sensors are connected to the engine, which respond to various operating parameters, and signals representing the parameters are transmitted to computer processing equipment. A speed sensor responds to the movement of an engine part such as the teeth of the engine fly-wheel ring gear, and the processor calculates a function representing the change in the instantaneous engine kinetic energy. The kinetic energy change data are accumulated during an engine acceleration run and again during a deceleration run. The signals from an engine cycle event sensor are processed to indicate the firing intervals of the cylinders and thereby to correlate the engine acceleration and deceleration data. The changes in kinetic energy during the cylinder firing intervals are measured during engine acceleration, and the kinetic energy changes are again measured during deceleration, the two sets of measurements being at substantially the same engine speed. For each cylinder, the measurement on deceleration is subtracted from the related measurement on acceleration, to obtain the net work produced by each cylinder. A similar procedure may be followed to obtain the work done over segments of each firing interval, to thereby check the compression balance of the cylinders.

25 Claims, 25 Drawing Figures

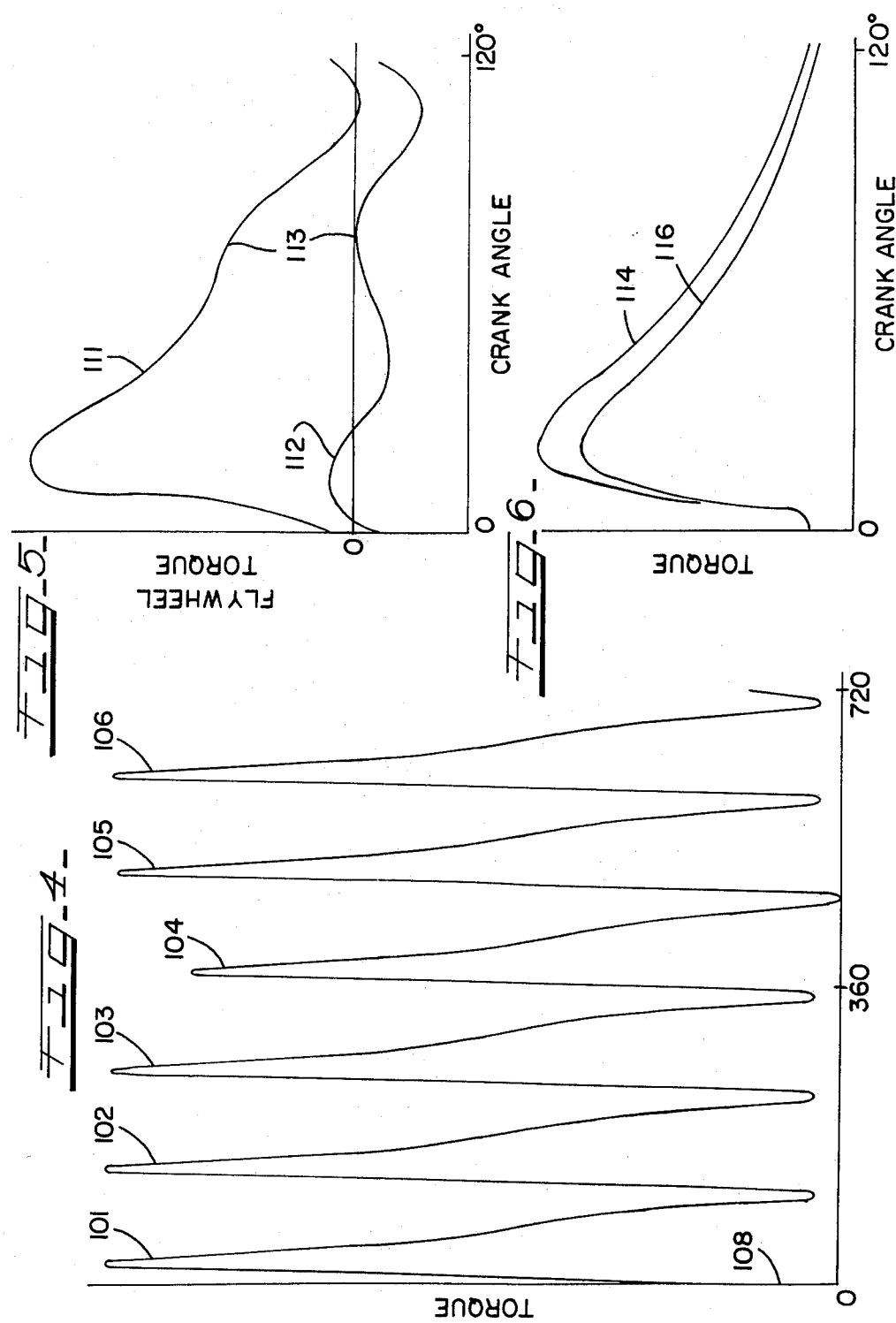

```
C     COMMENTARY FOR CYLPERFORMANCE ANALYSIS ROUTINE
C
C        NOTE1: A 'C' OR '*' GENERALLY IMPLIES COMMENTARY;
C               HOWEVER, A '*' IN AN ARITHMETIC STATEMENT MEANS
C               MULTIPLY.
C        OBJECT: TO DETERMINE THE RELATIVE AMOUNT OF WORK DONE
C                BY EACH ENGINE CYLINDER.
C
C        APPROACH: TIME INTERVAL DATA FROM THE ENGINE'S FLYWHEEL RING
C                  GEAR IS USED TO COMPUTE A FUNCTION WHICH VARIES
C                  DIRECTLY WITH KINETIC ENERGY CHANGES DURING THE
C                  ENGINE CYCLE.
C                  THE CYCLE-EVENT-MARKER(CEMRK) WILL ALSO BE ACCESSED
C                  IN ORDER TO ASSOCIATE TIME INTERVAL DATA WITH THE
C                  APPROPRIATE CYLINDER.
C
C        DEFINITIONS:
C            (ARRAY)TIMINT*RAW DATA FROM DUAL-POLE SENSOR.
C                   CEMRK*OCCURENCE OF CEMRK ON DESIGNATED CYLINDER.
C                   LOCMRK*CYLINDER ON WHICH CEMRK IS LOCATED.
C            (ARRAY)DLTWSQ*DIFFERENCE IN OMEGA-SQUARED OVER INTERVAL
C                   THE INTERVAL INTCMP(THIS QUANTITY IS PROP-
C                   PORTIONAL TO KINETIC ENERGY CHANGE
C                   DURING A PORTION OF THE ENGINE CYCLE.
C                   INTCMP* ANGULAR INTERVAL OVER WHICH DLTWSQ
C                   *IS COMPUTED
C            (ARRAY)PZX****LOCATIONS IN TIMINT BUFFER WHERE DLTWSQ
C                   PASSES THRU ZERO GOING POSITIVE
C                   PZX SYNONYMOUS WITH TDC(TOP-DEAD-CENTER)
C
C            (ARRAY)IDCYL**GIVES CYLINDER NUMBER FOR CORRESPONDING PZX
C                   OFFSET*DISTANCE BETWEEN CEMRK AND CLOSEST PZX
C                   (IN DIRECTION OF ROTATION)
C            (ARRAY)FIRORD*A TABLE GIVING THE FIRING ORDER OF THE
C                   ENGINE UNDER TEST
C                   PROBCAL*THE CONVERSION FACTOR THAT RELATES
C                   TIMINT TO RPM (RPM=PROBCAL/TIMINT)
C
C            (ARRAY)INTBPS*THE DISTANCE BETWEEN ADJACENT PZX,INDEXED
C                   BY IDCYL(INTEVAL BETWEEN POWER STROKES)
C
C            SUMINT*SUM OF INTBPS FOR A FULL CYCLE
C                   SHOULD BE TWICE THE NUMBER OF GEARTEETH
```

FIG. 7A

```
C
C           ROUTINES CALLED:
C
C                ACQUIRE****GETS DATA FROM COUNTER OR A/D CHANNEL
C
C                CALIBRATE**ESTABLISHES PROBCAL BY RELATING AVERAGE
C                           CYCLE TIME TO AVERAGE TIMINT
C
C                SETUP******COMPUTES PARAMETERS NEEDED TO ANALYZE TIMINT
C                           DURING EXPANSION ROUTINE
C
C                DELTKE*****COMPUTES DLTWSQ
C
C                POZERO*****FINDS PZX FROM SMOOTHED TIMINT DATA
C
C                SMOOTH*****SMOOTHS RAW DATA USING STANDARD NUMERICAL
C                           TECHNIQUES SUCH AS RUNNING AVERAGE,MEDIAN
C                           SORTING AND/OR RECURSIVE FILTER
C                EXPANSION***COMPUTES WORK DONE DURING EXPANSION STROKE

C                           FOR EACH CYLINDER
C                REPORT*****STORES/DISPLAYS RESULTS OF PRECEDING ROUTINS
C
C      END OF COMMENTARY
C
```

FIG. 7B

```
C    BEGIN METACODE
C
         START POWERBALANCE
C
C    START BY PROMPTING OPERATOR FOR ENGINE AND TEST INFORMATION
C    THIS ROUTINE IS A STANDARD INTERACTIVE PROMPT/READ/STORE ACTIVITY
C
         CALL GETINFO
C
C        THIS ROUTINE RETURNS WITH AN ENGINE CODE OR MODEL NUMBER WHICH
C        IS KEYED TO A TABLE OF ENGINE AND TEST PARAMETERS STORED
C        ON CONVENTIONAL MEDIA SUCH AS MAGNETIC TAPE,DISC,ETC
C        THE NEXT CALL ALLOWS THE SYSTEM TO LOOK UP THAT INFORMATION
C        AND STORE IT IN A COMMON DATA AREA FOR LATER ACCESS BY
C        THE DATA ACQUISITION AND ANALYSIS ROUTINES.
C
         CALL LOOKUP(ENGCODE)
C
C            THE INFORMATION OBTAINED BY LOOKUP MAY INCLUDE SUCH
C            THINGS AS NUMCYL,FIRORD, AND TEST CONTROL DATA TO
C            DEFINE: A)WHAT TESTS TO BE PERFORMED;
C                    B)HOW MANY SAMPLES REQUIRED
C                    C)PROMPTS OR MESSAGES TO THE OPERATOR
C                    D)THRESHHOLD VALUE(S) TO INITIATE DATA
C                         ACQUISITION
C
C
RERUN1   CALL SETUP
C
C        SETUP ROUTINE DOES ANALYSIS OF IDLE SPEED OR LOW SPEED DECEL
C        TO DERIVE SOME PARAMETERS NEEDED FOR THE EXPANSION ROUTINE.
C        THE PRIMARY PARAMETERS IT RETURNS INCLUDE SUMINT,INTBPS AND
C        OFFSET.
C
RERUN2   CALL EXPANSION
C
C        THE EXPANSION ROUTINE PROMPTS OPERATOR FOR ENGINE ACCELERATION
C        AND DECELERATION AT APPROPRIATE TIMES.
C        IT REDUCES TIMINT DATA AND STORES PERTINENT RESULTS SUCH AS
C        ACCEL AND DECEL (ARRAYS RELATING DELTA-W2 FOR EACH FIRING
C        INTERVAL)
C        IT COMPUTES DELTA-OMEGA-SQUARED FOR EACH FIRING INTERVAL
C        AND REPORTS THE RESULTS IN A STANDARD FORMAT.
C
         PROMPT "RERUN TEST?(YES/NO)"
         READ REPLY
              IF (REPLY="NO") STOP
              PROMPT "USE SAME SETUP?(YES/NO)"
              READ REPLY
              IF(REPLY=YES)GO TO RERUN2
              ELSE GO TO RERUN1
C    OPERATOR IS PROMPTED FOR ADDITIONAL RUNS AS DESIRED.
C    RERUN2 SEND CONTROL BACK TO EXPANSION ROUTINE WITHOUT
C    COMPUTING NEW PARAMETERS IN SETUP ROUTINE.
C
         END POWERBALANCE
C
```

FIG. 7C

```
                BEGIN SETUP(MODE)
                    LOOP
                        CALL THRSHLD(LOSPEED,CEMRK,DECRS)
C                           SET UP THRESHHOLD FOR ACQUIRING LOW-SPEED DATA
C                           DURING A DECELERATION;USE THE CYCLE-EVENT MARKER
C                           TO MEASURE THE SPEED THRESHHOLD.
C                           'LOSPEED' IS ENGINE SPEED AT WHICH DATA ACQUISITION BEGINS    !
C                           'CEMRK' IS CHANNEL USED TO MEASURE ENGINE SPEED               !
C                           'DECRS' MEANS START WHEN SPEED IS BELOW 'LOSPEED'             !
C
                        CALL ACQUIRE(TIMINT,NUMPTS)
C
C                           ACQUIRE GETS LOW-SPEED DATA FROM CECNTR AND PPCNTR)           !
C
                        CALL CALIBRATE(TIMINT,CEMRK,PROBCAL)
C
C                           CALIBRATE USES CEMRK AND TIMINT DATA TO DERIVE
C                           A CONVERSION FACTOR(PROBCAL) FOR COMPUTING A
C                           SPEED(RPM OR RADS/SEC) FROM ANY TIMINT VALUE.
C
                        CALL SMOOTH(TIMINT,IST,LAST)    *'IST' AND 'LAST' ARE ENDPOINTS   !
C                                                       *OF TIMINT ARRAY
C                           SMOOTH USES STANDARD NUMERICAL TECHNIQUES TO FILTER THE
C                           DATA(TIMINT) AND ELIMINATE EXTRANEOUS OR WILD POINTS.
C
                        CALL POZERO(TIMINT,PZX)
C
C                           POZERO DETECTS LOCATIONS IN TIMINT BUFFER WHERE
C                           DELTA-OMEGA-SQUARED IS PASSING THROUGH ZERO IN A
C                           POSITIVE SENSE.THESE INDICES ARE STORE IN ANOTHER BUFFER
C                           NAMED PZX.
C
C
                        CALL FIRINT(PZX,INTBPS,SUMINT,OFFSET)                             !
C
C                           FIRINT DOES SOME BOOKKEEPING TO ENSURE THE PZX'S
C                           THAT WERE FOUND CORRESPOND TO REASONABLE INTERVALS
C                           BETWEEN POWERSTROKES(INTBPS).THE VALUES OF INTBPS SO
C                           DETERMINED ARE THEN USED IN SUBROUTINE IDENTIFY
C                           TO ASSIGN A NAME TO EACH TDC LOCATION.
C
                    END LOOP
                    RETURN
                END SETUP(MODE)
C
```

FIG. 7D

```
                BEGIN THRSHLD(THRSHVAL,THRSHCHN,SENSE)
C                       THIS ROUTINE LOOKS AT DATA ON THE PRESCRIBED
C                       CHANNEL(THRSHCHN) AND COMPARES IT TO A REFERENCE VALUE
C                       (THRSHVAL)."SENSE" IS A LOGIC WORD USED TO DEFINE
C                       WHETHER THE THRESHHOLD VARIABLE SHOULD BE INCREASING
C                       OR DECREASING.FOR EXAMPLE, IF THE THRESHHOLD PARAMETER
C                       IS TIMINT,IT SHOULD DECREASE IF THE ENGINE IS ACCEL-
C                       ERATING, AND INCREASE IF THE ENGINE IS DECELERATING.
C                       AN ANALOG PARAMETER SUCH AS LUBRICATING SYSTEM PRESSURE
C                       RESPONDS IN THE OPPOSITE SENSE:A/D CONVERTER COUNTS
C                       NORMALLY INCREASE WITH INCREASING PRESSURE.
C
                    ACQ = .FALSE.           *SET FLAGS BEFORE
                    READY=.FALSE.           *STARTING CHECKING ROUTINE
C
C                       PROMPT OPERATOR FOR APPROPRIATE
C                       ENGINE OPERATION: ACCELERATE/DECELERATE/IDLE/HIGH IDLE
C
                        IF(SENSE = INCRS) PROMPT "ACCEL"
                        ELSE PROMPT "DECEL"
                        IF (THRSHCHN=PPTMR OR CEMRK) INVERT(SENSE)
C                               THE SENSE IS NOW INVERTED SO
C                               THE APPROPRIATE COMPARE WILL
C                               USED WHEN DATA IS AVAILABLE.
C
C                       LOOP TO SEE IF A THRSHHLD VALUE IS READY
C
                LOOP    READ THRSHCHN(READY)    *SEE IF CHANNEL HAS
                                                *DATA READY
C
                        IF(READY = .FALSE. ) JUMP LOOP  *KEEP LOOKING
                        ELSE READ COUNT         *READ THE VALUE AT
C                                               *THE CHANNEL ASSIGNED
                        READY=.FLASE.           *RESET READY FLAG
C
C                               NOW COMPARE VALUE WITH THRSHVAL AND TAKE
C                               APPROPRIATE ACTION.
C
                        IF(SENSE = INCRS) GO TO INCRSING
                        ELSE GO TO DECRSING
C
                INCRSING IF(COUNT .GE. THRSHVAL) RETURN  *THRSHLD REACHED;RETURN
C                                                       *CONTOL TO CALLING
C                                                       *ROUTINE
                        ELSE GO TO LOOP                 *KEEP LOOKING
                DECRSING IF ((COUNT .LE. THRSHVAL) RETURN
                        ELSE GO TO LOOP
                END THRSHLD
C
```

FIG. 7E

```
      BEGIN ACQUIRE(TIMINT,NUMPTS)
C
C*****************INITIALIZE PARAMETERS
C
            CTRSTS=.FALSE.      *LOGIC WORD SET WHEN TIMER-COUNTER READY
            I=1                 *INITIALIZE COUNTER RECORDING NUMBER OF
C                                DATA SAMPLES
            ENABLE CTRTMR(PPTMR,CEMTMR)*ENABLE THE COUNTER-TIMER FOR
C                                *POLE- POLE TIME INTERVALS AND CEM TIME
C                                *INTERVALS.
C                                *THE CEM TIME INTERVALS(COUNTS) MAY BE
C                                *IDENTIFIED BY NEGATING THE VALUE OR
C                                *OTHERWISE MAKING AN OBVIOUS FLAG IN
C                                *THE DATA AS IT IS BEING READ FROM THE
C                                *COUNTER-TIMER MODULE.
C
C                                *LOOP TO OBTAIN TIMINT AND CEMRK DATA
C                                *CTRSTS GIVES A .TRUE. SIGNAL WHEN DATA
C                                *IS READY ON CTRTMR
      CHKRDY READ CTRSTS
            IF(CTRSTS=.FALSE.)JUMP TO CHKRDY
            RDSTR               *READ CTRTMR(COUNT)
            CTRSTS=.FALSE.      *RESET CTRSTS FLAG
            TIMINT(I)=COUNT     *STORE COUNT IN TIMINT
            I=I+1               *INCREMENT COUNTER
            IF(I= .LE. NUMPTS) JUMP TO CHKRDY   *ENOUGH POINTS OBTAINED?
                        ELSE RETURN             *YES,LEAVE
      END ACQUIRE
C
```

FIG. 7F

```
C
        BEGIN CALIBBRATE(CEMRK,TIMINT,PROBCAL)
                IF MARK .LT. 2          *ARE THERE ENOUGH CEMRKS?
                        CALL ERROR      *NO,ALERT OPERATOR
                ENDIF
                ALPHA=0.9               *WEIGHT FACTOR FOR RECURSIVE FILTER
                PROBCAL=0               *INITIALIZE PROBCAL
                DO FOR K=2,MARK         *LOOP
                        IST=CEMRK(K-1)  *DEFINE ENDPOINTS IN TIMINT ARRAY
                        LAST=CEMRK(K)
                        AVTIME=TIMINT(IST)      *INITIALIZE AVTIME
                        DO FOR I FROM IST TO LAST *LOOP
                                AVTIME=ALPHA*AVTIME+(1-ALPHA)*TIMINT(I)
C                                       *THIS CONSTITUTES A RECURSIVE FILTER
C                                       *OPERATING ON TIMINT
                        END FOR I
C
C       CONVERT CEMRK COUNTS TO RPM(TWO CYCLES BETWEEN CEMRK EVENTS)
C       USING CEMRK CLOCK FREQUENCY(CEMCLKFREQ)
C
                        RPM=120/CECNTS(LAST)*CEMCLKFREQ
                        AVTIME=AVTIME/NSUM
                        PROBCAL=PROBCAL+RPM*AVTIME *EQUATE ENGINE CYCLE
C                                                  *TIME WITH AVTIME
                END FOR K               *THIS LOOP AVERAGES PROBCAL
C                                       *OVER K-1 CYCLES
        RETURN
        END CALIBRATE
```

FIG. 7G

```
BEGIN SMOOTH
    GET NFILT                      *ANALYSIS PARAMETER
    CALL MEDIAN(TIMINT,NFILT)      *DO A RUNNING MEDIAN FILTER
    GET NAVG                       *ANOTHER ANALYSIS PARAMENTER
    CALL RUNAV(TIMINT,NAVG)        *DO A RUNNING AVERAGE OF NFILT VALUES
    GET ALPHA                      *GET WEIGHT FACTOR FOR RECURSIVE FILTR
    CALL RECURSIVE                 *DO SINGLE-STAGE RECURSIVE FILTER
    RETURN
END SMOOTH
C
BEGIN POZERO                       *FIND POSITIVE-ZERO CROSSINGS
    NCROSS=0                       *INITIALIZE COUNT OF PZX'S
    J=IST                          *DEFINE START POINT
    K=IST+INTCMP                   *DEFINED ENDPOINT
    LOOP UNTIL K = NUMPTS-1                    *LOOK FOR A CONDITION
        IF TIMINT(J) .LE. TIMINT(K)            *WHERE A CHANGE IN SIGN
            IF TIMINT(J+1) .GT. TIMINT(K+1)    *(POSITIVE-GOING
                NCROSS=NCROSS+1                *WOULD OCCUR IF WE WERE
                PZX(NCROSS)=J+1                *LOOKING AT DW2
            ENDIF
        ENDIF
    END LOOP
END POZERO
C
```

FIG. 7H

```
        BEGIN EXPANSION
            GET NUMSETS         *TEST PARAMETER THAT TELLS HOW
C                               *MANY ACCEL RUNS TO MAKE
            N=0
C
        LOOPACL                             *START LOOP TO
            CALL THRSHLD(ACCLSPD,TIMINT,INCRS)   *SET UP THRSHLD FOR AN
C                                               *ACCELERATION SAMPLE
            CALL ACQUIRE(TIMINT,NUMPTS)         *GET PPCNTS AND CEM COUNTS
            CALL SMOOTH                         *SMOOTH TIMINT DATA
            CALL IDENTIFY(TDCACL,NACL,IDACL,INTBPS,LOCMRK,CEMRK,OFFSET)     !
                                                *FIND TDC LOCATIONS         !
            CALL DELTKE(TIMINT,TDCACL)          *COMPUTE DELTA-OMEGA-SQUARED
C                                               *FOR EACH FIRING INTERVAL
            N=N+1                               *INCREMENT SET COUNTER       FIG. 7I
            IF(N=NUMSETS) ESCAPE                *SEE IF ENOUGH SETS DONE
        END LOOPACL
        LOOPDCL
            CALL THRSHLD(DCLSPD,TIMINT,DECRS)   *SET UP THRSHLD FOR A DECEL
            CALL ACQUIRE(TIMINT,NUMPTS)         *GET THE DATA
            CALL IDENTIFY(TDCDCL,NDCL,IDDCL,INTBPS,LOCMRK,CEMRK,OFFSET)     !
                                                *FIND THE TDC LOCATIONS AS  !
C                                               *FOR LOOPACL                !
            CALL DELTKE(TIMINT,TDCDCL)
        END LOOPDCL
            CALL EXPWORK            *COMPUTE THE DIFFERENCE IN ACCEL AND
                                    *DECEL ARRAYS
        END EXPANSION
C
```

```
BEGIN IDENTIFY(TDC,NTDC,ICYL,INTBPS,LOCMRK,CEMRK,OFFSET)

LOCHEK=CEMRK(1)+OFFSET   #DEFINE FIRST TDC LOCATION
        LCYL=LOCMRK              #ASSIGN ID OF CYLINDER THERE
        LOOP
                IF LOCHEK .LT. IST  #IS LOCHEK AHEAD OF FIRST VALID DATA?
                        LOCHEK=LOCHEK+INTBPS(LCYL)  #YES, INCREMENT LOCHEK
                        LCYL=NEXTCYL(LCYL)          #AND LCYL
                        GO TO LOOP
                ELSE
                        IF LOCHEK .GT. IST+INTBPS(LCYL) #NO, CHEK OTHER END
                                LOCHEK=LOCHEK-SUMINT     #ADJUST LOCHEK BY
                                                         #LENGTH OF A CYCLE
                        ELSE
                                ESCAPE    #OK, READY TO GO; KNOW WHERE FIRST TDC
                                          #IS AND WHICH CYLINDER IT IS.
                        ENDIF
        END LOOP
        NTDC=1                   #SET UP COUNTER
        INDEX=1                  #SET UP AND INDEX POINTING AT CURRENT
                                 #VALUE OF CEMRK BEING USED

CHEK IF LOCHEK .LT. CEMRK(INDEX)  #IS LOCHEK BEYOND PRESENT CEMRK?
                GO TO ENTER       #NO, ASSIGN VALUES AND LOOP BACK
        ELSE
                IF INDEX .GE. MARK    #CAN T GO BEYOND NUMBER OF CEM
                        ESCAPE        #VALUES OBTAINED
                ELSE
                        INDEX=INDEX+1  #POINT INDEX AT NEXT CEMRK
                ENDIF
ENDCHEK
        INDEX=LAST        #NO MORE CEMRKS; POINT INDEX AT LAST DATA
        GO TO LASTPASS
```

FIG. 7J

```
LOOP2
        LOCHEK=LOCHEK+INTBPS(LCYL)  *COMPUTE NEXT LOCHEK
        LCYL=FIRORD(LCYL)           *COMPUTE NEXT CYLINDER ID
        IF LOCHEK > CEMRK(INDEX)    *IS LOCHEK BEYOND PRESENT CEM?
            LCYL=LOCMRK             *YES,RESET LCYL
            LOCHEK=CEMRK(INDEX)+OFFSET *USE NEXT CEM
            IF INDEX > MARK         *SEE IF INDEX CAN BE INCREASED
                INDEX=LAST          *NO,SET IT TO LAST DATA POINT
                GO TO LASTPASS      *BUT THERE MAY BE MORE
                                    *DATA TO PROCESS.
            ELSE
                INDEX = INDEX +1    *YES,BUMP IT AND CONTINUE
            ENDIF
        ENDIF
ENTER   TDC(NTDC)=LOCHEK            *ASSIGN VALUE TO TDC
        ICYL(NTDC)=LCYL             *AND ICYL
        NTDC=NTDC+1                 *INCREMENT NTDC COUNTER
END LOOP2

LASTPASS            *FROM HERE ON THERE ARE NO MORE CEMRK'S
        TDC(NTDC)=LOCHEK            *ASSIGN PRESENT VALUES
        IDCYL(NTDC)=LCYL
        LOCHEK=LOCHEK+INTBPS(LCYL)  *COMPUTE NEXT LOCHEK
        LCYL=FIRORD(LCYL)           *AND LCYL
        IF LOCHEK > LAST            *IS LOCHEK BEYOND DATA FIELD?
            ESCAPE LASTPASS         *YES,GET OUT
        ENDIF
        NTDC=NTDC+1                 *NO,BUMP COUNT AND GO AGAIN
    END LASTPASS
END IDENTIFY
```

FIG. 7K

```
            BEGIN DELTKE(TIMINT,DW2,TDC,IDCYL)
C
C              THIS ROUTINE COMPUTES DELTA-OMEGA-SQUARED(W2**2-W1**2)
C              WHICH IS PROPORTIONAL TO CHANGE IN KINETIC ENERGY
C              (DELTA-KE) OVER THE INTERVAL SPECIFIED(INTCMP)
C
            GET INTCMP            *TEST PARAMETER
            DO WHILE I=1,NTDC     *LOOP:
                INDEX=I           SET POINTER AT CURRENT TDC LOCATION
                DO FOR J=1 TO 3
                    DW2(J,I)= DELTW2(INTCMP,INDEX) *COMPUTE DW2
                    INDEX=INDEX+INTCMP            *INCREMENT POINTER
                END FOR J
            END WHILE I
            END DELTKE
            BEGIN DELTW2(INTRVL,INDEX)
C
C              DELTW2 IS A FUNCTION CALLED BY DELTKE TO PERFORM
C              THE COMPUTATION OF DELTA-OMEGA-SQUARED.
C
            OMEGA1=PROBCAL/TIMINT(INDEX)        *DEFINE OMEGA1
            OMEGA2=PROBCAL/TIMINT(INDEX+INTCMP) *DEFINE OMEGA2
            DELTW2=OMEGA2**2-OMEGA1**2          *SQUARE AND SUBTRACT
            END DELTW2(INTRVL,INDEX)
C
            BEGIN EXPWORK(ACCEL,DECEL,NUMCYL,NACL,NDCL)
                CALL AVERAGE(DECEL,NDCL,INDDCL)  *AVERAGE ALL VALUES OF DECEL
C                                                *FOR EACH CYLINDER.
                DO WHILE I INCREMENTS BY NUMCYL
                    DO FOR K=I TO I+NUMCYL-1   *FIRST ALIGN CYLINDERS IN
                        INDXA(IDCYL(K))=K      *ASSOCIATE INDXA WITH PRESENT PT
                    END FOR K
                    SUMWORK=0         *INITIALIZE A SUM
                    NUMSUM=0          *INITIALIZE A COUNT
                    DO WHILE K=1 TO NUMCYL
                        DO FOR J=1,3
                            EXPWRK(J,K)=ACCEL(J,INDXA(K))-DECEL(J,INDDCL)
C                                                *TAKE DIFFERENCE BETWEEN
C                                                *ACCEL AND DECEL
                        END FOR J
                        SUMWORK=SUMWORK+EXPWRK(1,K) *ADD RESULT TO SUM
                    END WHILE K
                    SUMWORK=SUMWORK/NUMCYL  *NORMALIZE RESULT IN SUMWORK
                    CALL EXPRPT(SUMWORK,EXPWRK) *REPORT RESULTS IN A
C                                                *STANDARD FORMAT
                END WHILE I
            END EXPWORK
```

FIG. 7L

```
BEGIN AVERAGE(DW2,NTDC,INDX)
C
C           THIS ROUTINE AVERAGES SEVERAL VALUES OF DW2
C           FOR EACH CYLINDER
C
    DO FOR I=1 TO NTDC, NUMCYL AT A TIME
        KOUNT=0                         *INITIALIZE KOUNT
        DO FOR J=I+NUMCYL TO NTDC IN INCREMENTS OF NUMCYL
            INDX(ICYL(I))=I             *SET UP INDEX
            DO WHILE K INCREMENTS TO 3
                DW2(K,INDX)=DW2(K,INDX)+DW2(K,J)
            END WHILE
        END FOR J
        DW2(K,I)= DW2(K,I)/KOUNT   *NORMALIZE BY NUMBER
    END FOR I                       *OF POINTS ADDED
END AVERAGE
C
    END METACODE
```

FIG. 7M

```
        BEGIN FIRINT (PZX,INTRPS,SUMINT,OFFSET)
C                 THIS ROUTINE WILL DETERMINE THE INTERVALS
C                 BETWEEN POWER STROKES(INTRPS) AND VERIFY
C                 THAT THE INTERVALS ARE LEGITIMATE.
C
C                 IT THEN COMPUTES THE VALUE OF OFFSET
C                 (THE DISTANCE BETWEEN CEMRK AND THE CLOSEST
C                 PZX.
C                 IT ALSO DETERMINES THE NUMBER OF GEARTEETH
C                 PASSING A POINT IN ONE ENGINE CYCLE AS
C                 A FUNCTION OF THE SUM OF THE FIRING INTERVALS
C                 (SUMINT).
C
C       COMPUTE THE INTERVALS
            FOR I=2,NCROSS(THE NUMBER OF PZX'S)
            INTRPS(I-1)=PZX(I)-PZX(I-1)
            END FOR I
C
C       NOW ELIMINATE ANY OVERLY LONG OR SHORT INTERVALS
C       BY PASSING INTRPS THRU A MEDIAN FILTER
C
            NFILT=7
            END = NCROSS-1
            BEGIN=1
            CALL MEDIAN(INTRPS,NFILT,BEGIN,END)
C
C                 THE VALUES RETURNED IN INTRPS WILL BE DISPLACED
C                 BY (NFILT+1)/2
C
            INTRC=INTRPS(1)
C
C       COMPARE THIS VALUE WITH EXPECTED RANGE:MAXINT/MININT
C
            IF(INTRC .LE. MAXINT)GO TO TRYMIN   *IS VALUE BELOW MAX?
                CALL FAULT                      NO.WARN OPERATOR
                STOP
      TRYMIN IF(INTRC .LT. MININT) GO TO OK1    *IS VALUE ABOVE MIN?
                CALL FAULT                      *NO WARN OPERATOR
                STOP
C
C       SUM UP INTERVALS FOR ONE ENGINE CYCLE
C
      OK1   SUMINT=0
            DO FOR I=1 TO NUMCYL
                SUMINT=SUMINT+INTRPS(I)
            END FOR I
```

FIG. 7N

```
C
C              NOW COMPUTE OFFSET
C              FIND PZX CLOSEST TO CEMRK
C
        KOUNT=1
        OFFSET=0
PZXLOOP IF(PZX(KOUNT) .GE. CEMRK(1)) GO TO FOUND
        KOUNT=KOUNT+1
END PZXLOOP
C
FOUND OFFSET=PZX(KOUNT)-CEMRK(1)
C
C              NOW ASSIGN VALUES TO INTBPS FOR GOOD.
C              PREVIOUS VALUES ONLY USED TO COMPUTE INTBC.
C
C              DO THIS BY DIVIDING CYCLE INTO TWO PARTS

C              AND ASSIGNING INTERVALS SUCH THAT SUM OF
C              INTERVALS EQUALS SUMINT.
C
        NEWSUM=SUMINT/2    #USE INTEGER ARITHMETIC
        HLFNUM=NUMCYL/2
        KOUNT=1
LOOPX   INTBPS(KOUNT)= INTBC
        IF(KOUNT .GE. HLFNUM) GO TO SECOND
        NEWSUM=NEWSUM-INTBC
        INTBC=NEWSUM/(HLFNUM-KOUNT)
        KOUNT=KOUNT+1
        GO TO LOOPX
SECOND  NEWSUM=SUMINT-SUMINT/2
        INTBC=NEWSUM/(NUMCYL-KOUNT)
        KOUNT=KOUNT+ 1
        INTBPS(KOUNT)=INTBC
        IF(KOUNT=NUMCYL) GO TO DONE
        GO TO SECOND + 1
C
DONE    RETURN
C
END FIRINT
C
```

FIG. 70

```
        BEGIN MEDIAN(ARRAY,NF   ,BEGIN,END)
C
C         THIS ROUTINE FINDS THE MEDIAN VALUE OF NFILT CONSECUTIVE
C         VALUES IN THE ASSIGNED ARRAY AND REPLACES THE CURRENT VALUE
C         IN THE ARRAY WITH THE MEDIAN VALUE
C
            I=BEGIN
        FOR K=NFILT TO END          *SET UP LOOP TO RUN THRU ENTIRE ARRAY
            FOR JVAL=I TO K
                FOR IVAL=1 TO NFILT
                    SORT(IVAL)=ARRAY(JVAL)   *LOAD ARRAY TO BE SORTED
                END FOR IVAL
            END FOR JVAL
C
C         FIND VALUE IN TEMP THAT IS GREATER THAN NFILT/2
C         OF THE OTHER ELEMENTS.
C
            SRTPTR=1              *SET POINTER LOOKING AT SORT ARRAY
            INDEX=1               *SET INDEX POINTING AT FIRST GUESS
                                  *FOR MIN VALUE
            MIN=SORT(INDEX)       *ASSIGN MIN VALUE TO BE TESTED
            JSORT=INDEX+1         *SET POINTER LOOKING AT NEXT ELEMENT
      NEXT  IF(JSORT .GT. NFILT)  *HAVE WE GONE THRU ALL OF SORT ARRAY?
                GO TO REPLACE     *YES,STORE MIN VALUE AT ISORT
            ELSE                  *NO,TEST NEXT ELEMENT
            IF(MIN .LE. SORT(J) ) *IS THIS REALLY A MIN?
                GO TO OK1         *YES,INCREMENT JSORT AND TEST NEXT VAL
            ELSE MIN=SORT(JSORT)  *NO, ASSIGN NEW MIN VALUE
            INDEX=JSORT           *REASSIGN SORT INDEX
      OK1   JSORT=JSORT+1         *INCREMENT SORT POSITION
            GO TO NEXT            *KEEP SORTING
      REPLACE I=INDEX
          CHEKI IF(I=SRTPTR) GO TO STEP *HAS I REACHED SRTPTR YET?
            ELSE
            SORT(I)=SORT(I-1)     *NO,PULL ELEMENTS UP ONE LOCATION
            I=I-1
            GO TO CHEKI
      STEP  SORT(ISORT)=MIN       *PLACE MIN IN SPACE OPENED FOR IT
            IF(ISORT=NFILT) GO TO RESET  *HAVE NFILT VALUES BEEN SORTED?
            ELSE
            ISORT=ISORT+1         *NO,INCREMENT SORT POINTER TO NEXT
            INDEX=ISORT           *RESET INDEX
            GO TO NEXT-1          *SET VALUE OF MIN TO FIRST UNSORTED
C                                 *ELEMENT
C         NOW REPLACE ARRAY ELEMENT WITH MEDVAL
C
            ARRAY(I)=SORT((NFILT+1)/2)
            I=I+1
        END FOR K
C
        END MEDIAN
```

FIG. 7P

```
BEGIN RUNAV(ARRAY,NAVG,BEGIN,END)
C
C       RUNNING AVERAGE RETURNS A VALUE TO THE INPUT ARRAY
C       THAT IS THE AVERAGE OF NAVG VALUES SURROUNDING
C       THAT VALUE
C
        AVRGE=0                     *INITIALIZE SUM VARIABLE
        I=1
             DO FOR ISUM=I TO NAVG       *LOAD SUM WITH FIRST
                 AVRGE=AVRGE+TEMP(ISUM)  *NAVG VALUES
             END FOR ISUM
        FOR J=NAVG TO ENDPOINT OF ARRAY  *GO THRU ENTIRE ARRAY
             SAVE=ARRAY(I)               *SAVE OLD ARRAY VALUE
             ARRAY(I)=AVRGE/NAVG         *STORE NEW ARRAY VALUE
             AVRGE=AVRGE-SAVE+ARRAY(J+1) *COMPUTE NEW SUM BY
             I=I+1                       *DROPPING OLD AND ADDING NEW
        END FOR J
END RUNAV
C
BEGIN RECURSIVE (ARRAY,ALPHA)
C
C       THIS ROUTINE DOES A SINGLE-STAGE RECURSIVE FILTERING
C       OF DATA IN THE ASSIGNED ARRAY USING THE WEIGHTING
C       FACTOR ALPHA
C
FOR I=2 TO END OF ARRAY
     ARRAY(I)=ALPHA*ARRAY(I-1) + (1-ALPHA)*ARRAY(I)
C            NEW VALUE IS MODULATED BY PRIOR HISTORY SIMILAR
C            TO ACTION OF A SIMPLE RC-FILTER
END FOR I
C
END RECURSIVE
C
```

FIG. 7Q

```
C        BEGIN COMPRESSN
C
C    THIS ROUTINE CALLS APPROPRIATE SUBROUTINES TO OBTAIN AND
C    ANALYZE LOW-SPEED DECELERATION DATA FOR THE PURPOSE OF
C    DETERMINING THE RELATIVE WORK OF COMPRESSION DONE BY EACH
C    CYLINDER.
C
         CALL GETINFO
         CALL LOOKUP
         CALL SETUP
C
C    DEFINITIONS:(IN ADDITION TO THOSE GIVEN IN POWERBALANCE)
C        CMPWORK*****COMPONENT OF DECEL ARRAY WHERE MOST COMPRESSION
C                    WORK IS DONE
C        SUMWORK*****A TEMPORARY LOCATION USED TO SUM VALUES
C                    OF CMPWORK
C        TDCDCL******LOCATION OF TDC POINTS IN TIMINT ARRAY
C                    (OBTAINED DURING DECEL)
C        NDCL********NUMBER OF TDCDCL POINTS OBTAINED
C        OFFSET******DISTANCE BETWEEN OCCURENCE OF CEMRK AND
C                    NEAREST TDC(SEE FIRINT ROUTINE)
C        DECEL*******VALUES OF DELTA-OMEGA-SQUARED DURING DECELERATION
C
C
         CALL SETUP
C
C    SETUP GETS LOW-SPEED DATA AND DETERMINES OFFSET AND INTERVAL
C    BETWEEN POWER STROKES.
C
C    FIND TDC LOCATIONS IN TIMINT ARRAY
C
         CALL IDENTIFY(TDCDCL,NDCL,IDDCL,INTBPS,LOCMRK,CEMRK,OFFSET)
C
C    COMPUTE CHANGE IN KINETIC ENERGY DUR ENGINE CYCLE
C
         CALL DELTKE(TIMINT,DECEL,TDCDCL,NDCL)
C
C    OPERATE ON DECEL ARRAY TO DETERMINE RELATIVE COMPRESSION WORK
C
         CALL CMPWORK
C
         END COMPRESSN
C
```

FIG. 7R

```
C
C          BEGIN CMPWORK
C
C    THIS ROUTINE OBTAINS THE DELTA-KE VALUES THAT OCCURED DURING
C    THE COMPRESSION STROKE FOR EACH CYLINDER AS THE ENGINE
C    UNDERWENT A LOW-SPEED DECELERATION
C
           CALL AVERAGE(DECEL,NDCL,INDDCL)
C
C    AVERAGE COMBINES DELTA-KE OVER SEVERAL CYCLES FOR EACH CYLINDER
C
           SUMWORK=0
           J=3
C
C    THE J INDEX PICKS THE PORTION OF FIRING INTERVAL WHERE GREATEST
C    AMOUNT OF COMPRESSION WORK IS DONE
C
           DO FOR K=1 TO NUMCYL
               CMPWRK=DECEL(J,K)
               SUMWORK=SUMWORK+CMPWRK(J,K)
           END FOR K
C
C    NOW COMPUTE AVERAGE COMPRESSION WORK DONE
C
           AVGWORK=SUMSORK/NUMCYL
C
C    NOW REPORT RESULTS IN A STANDARD FORMAT
C
           CALL CMPRPT(SUMWORK,CMPSRK,NUMCYL)
C
     END CMPWORK
C
```

FIG. 7 S 4,292,670

DIAGNOSIS OF ENGINE POWER AND COMPRESSION BALANCE

Frequently when a multicylinder internal combustion engine fails to deliver its rated power, the problem arises from the weakness or malfunctioning of one or two cylinders out of a total of, for example, six cylinders. In the case of a diesel engine, malfunctioning of a cylinder may be due, for example, to underfueling caused by failure of the fuel injector, or to worn piston rings and valves which cause loss of compression. Evidence of a malfunction may be roughness of engine operation or poor cylinder compression.

It is of course desirable to be able to identify a weak cylinder, and there are highly skilled mechanics who are able to do so using time consuming techniques. This solution is not, however, satisfactory to an engine manufacturer where many engines must be tested, or to service facilities where skilled mechanics often are not available. Devices such as thermocouples, vibration detectors and cylinder pressure sensors may be used in a laboratory but they generally are not desirable or available elsewhere.

U.S. Pat. No. 4,064,747 describes a method of identifying or isolating a weak or defective cylinder by measuring the instantaneous speed of the engine crankshaft as the engine goes through a complete operating cycle. When the instantaneous engine speed is plotted against time, a cyclically varying curve is obtained, and the maximum speed attained during the expansion stroke of a defective cylinder will normally not be as high as the speed attained for a normal cylinder. This method is not always accurate however, because it does not take into account variations in other engine parameters, such as the masses of the operating parts, inaccurate speed measurements, variations in cylinder compression work, etc.

It is a general object of this invention to provide an improved system for testing the power and compression balance among the cylinders, which eliminates the foregoing disadvantages.

In accordance with the present invention, means is provided for sensing the instantaneous engine speed and, during an acceleration run of the engine, measuring and storing the instantaneous engine speeds during at least one full cycle of the engine. At substantially the same engine speed during a deceleration run of the engine, the instantaneous speeds are again measured over at least one operating cycle. A function representing the change in kinetic energy during each firing interval is computed during acceleration and also during each firing interval during deceleration. For each firing interval, the two functions are subtracted to obtain the work from each cylinder.

The foregoing and other objects and advantages of the present invention will be better understood from the following detailed description taken in conjunction with the accompanying figures of the drawings, wherein:

FIGS. 4 to 6 are curves illustrating the operation of the engine and the system; and FIGS. 7-A to 7-S show a Metacode setting out the operation of a processor of the system.

DETAILED DESCRIPTION

Figure 1:
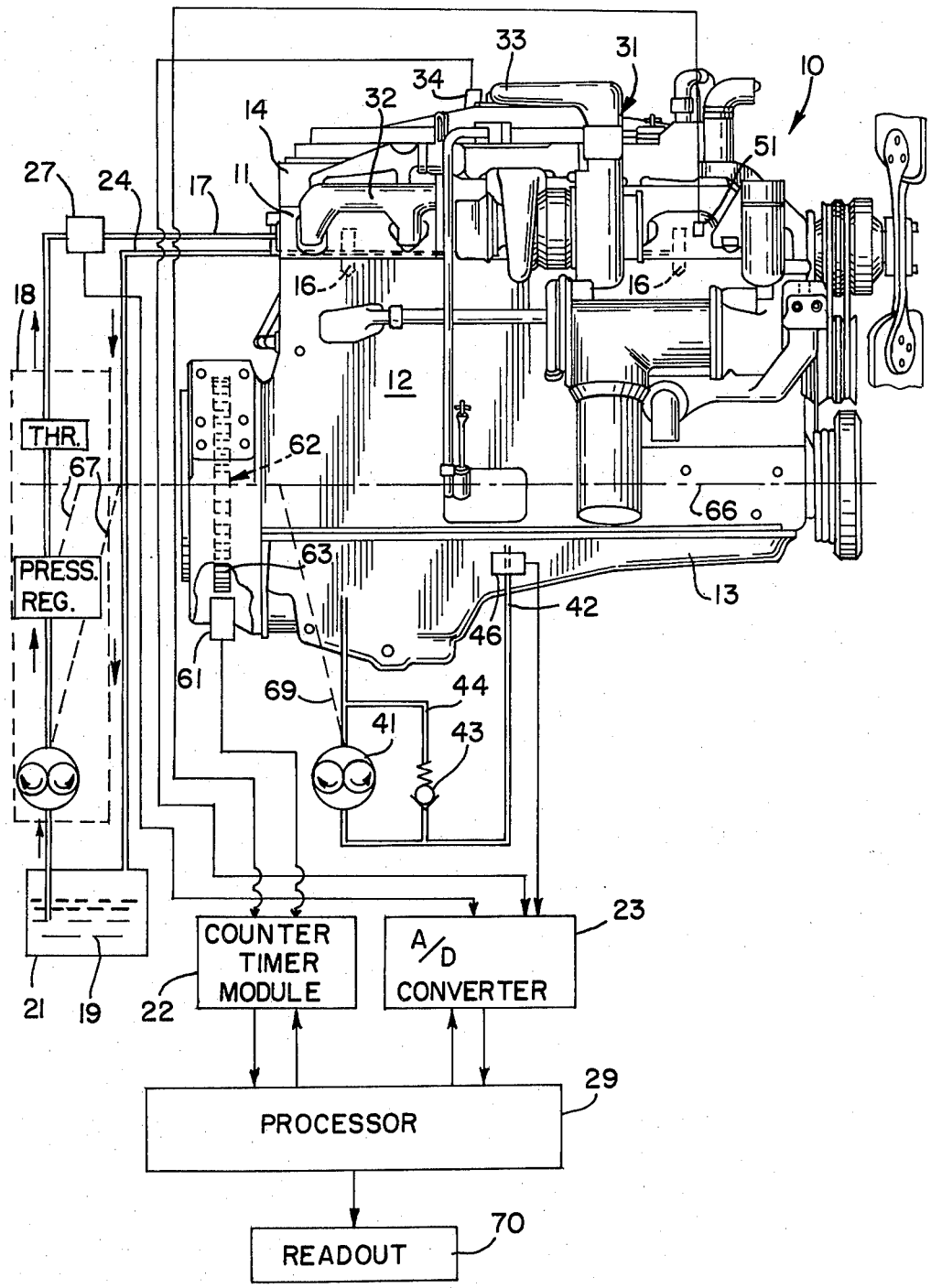
FIG. 1 is a view of an engine including a diagnostic system in accordance with the present invention.

With reference to FIG. 1, an engine 10 is illustrated which may be a standard internal combustion engine such as the NH series, six cylinder, in-line reciprocating piston, diesel engine manufactured by Cummins Engine Company, Inc. Such an engine includes a head 11, a block 12, an oil pan 13 and a rocker housing 14 fastened to the upper side of the head 11. The pistons (not shown) of the engine reciprocate within cylinders (also not shown) and are connected to rotate a crankshaft 66. A flywheel on the crankshaft has a ring gear 62 attached to it, teeth 63 on the gear 62 being selectively engaged by a starter motor (not shown) for starting the engine.

A plurality of fuel injectors 16 inject metered quantities of fuel into the cylinders after inlet air within the cylinders has been compressed sufficiently to cause compression ignition of the resultant combustable mixture. The injectors 16 may be a unit type embodying the features of the injectors shown in U.S. Pat. No. 3,351,288. A common fuel supply rail 17 connects the injectors 16 with a fuel supply system including a fuel pump 18 of the character shown in the U.S. Pat. No. 3,139,875. The fuel pump 18 draws fuel 19 from a reservoir or fuel tank 21 and forms a regulated fuel source for the fuel supplied to the rail 17. A throttle is incorporated in the fuel pump 18 and permits the operator of the engine to regulate the fuel pressure delivered to the injectors. Also connected to each of the injectors 16 is a fuel return rail 24 which carries fuel from the injectors 16 to the tank 21.

The engine 10 further includes a turbocharger unit 31 which may have a conventional design. The unit 31 includes a turbine that receives engine exhaust from an exhaust manifold 32 and it further includes a compressor that is connected by a duct 33 to an air intake manifold of the engine.

The engine 10 further includes a lubricant system for circulating a lubricant such as oil through the various operating parts of the engine. The lubricant system includes a pump 41 that draws the lubricant from a reservoir in the crankcase and pan 13 and pumps the lubricant under pressure to a lubricant rifle passage 42 in the block. The pressure in the rifle 42 is regulated by a pressure regulator valve 43 connected in a bypass line 44 that is connected across the pump 41.

A number of mechanical couplings, illustrated by dashed lines in FIG. 1 and indicated by the reference numerals 67 and 69, connect the crankshaft 66 with the fuel pump 18 and the lubricant pump 41, respectively.

A diagnostic system in accordance with the present invention is provided, and includes a cycle event marker (CEM) sensor 51 which is preferably mounted in the rocker housing 14 and responds to the movement of an operating part of the engine. For example, the CEM sensor 51 may be a magnetic coil proximity type sensor that is mounted adjacent the rocker arm that actuates the injector 16 of the number one cylinder. This rocker arm pivots during injection which occurs toward the end of the compression stroke of the piston of the number one cylinder and this movement causes the sensor 51 to generate a CEM signal toward the end of the compression stroke of the piston of the number one cylinder. The CEM signal is utilized in testing engine parameters as will be subsequently described.

Figure 3:
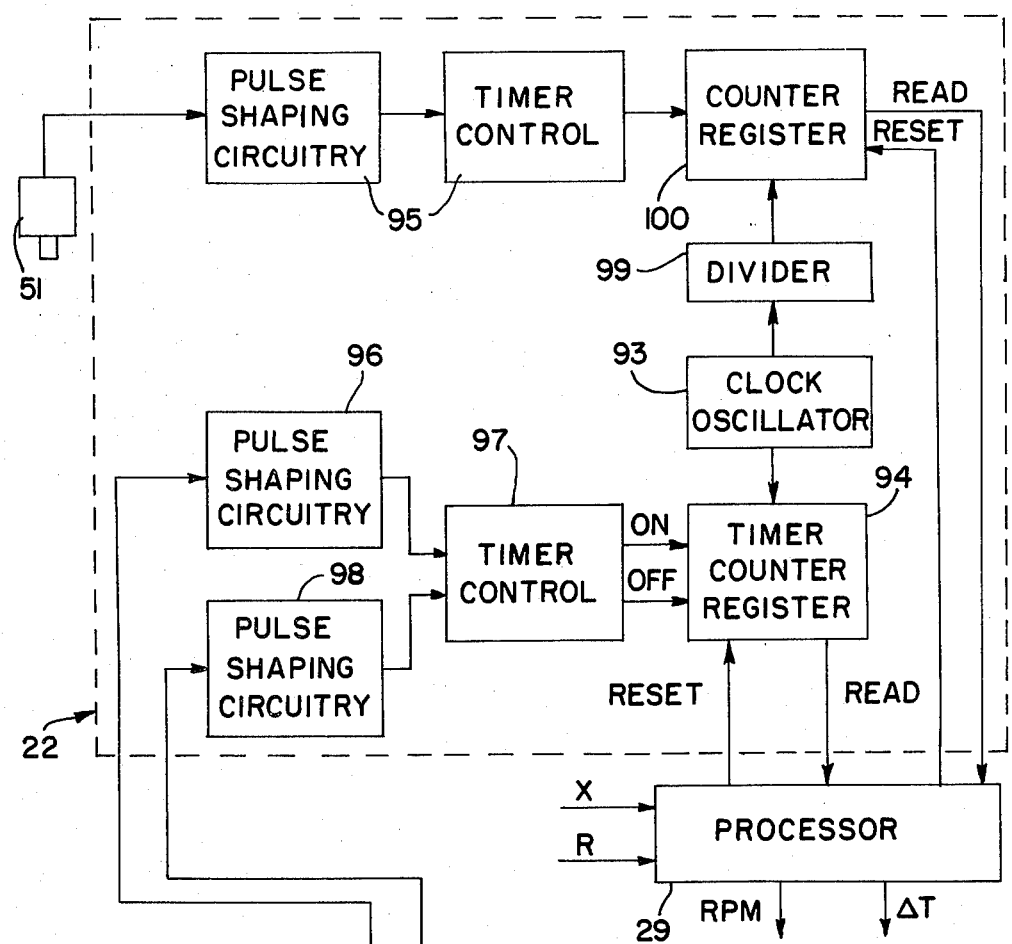
FIG. 3 is a block diagram of a speed measuring part of the system.

The diagnostic system still further includes an engine speed sensor 61 that is mounted adjacent to the outer periphery of the flywheel ring gear 62 of the engine 10. FIG. 3 illustrates an example of the sensor 61 and the circuits connected to it. The sensor 61 has two spaced elements 91 and 92 which in the present specific example, are variable reluctance magnetic sensors. The teeth 63, moving clockwise, generate signals first in the element 91 and then in the element 92. An oscillator 93 is connected to a counter 94 which is controlled by the tooth pulses from the elements. A pulse from the element 91 operates through circuits 96 and 97 to enable or start the counter 94 and a pulse from the element 92 operates through circuits 98 and 97 to disable or stop the counter. The count associated with each tooth is read by the processor 29. Each count is directly proportional to the time interval ($\Delta t$) for a tooth to move from one element 91 to the other element 92, and inversely proportional to the instantaneous speed of the ring gear. A factor for converting counts read to engine RPM may be provided as an input to the processor 29 based on physical measurements, such as the spacing X between the elements 91 and 92 and the radius R of the elements 91 and 92 or may be computed within the processor based on signals from the cycle event marker sensor 51. The CEM sensor 51 is connected through circuits 95, similar to the circuits 96–98, to a CEM counter-register 100. The signal from the oscillator 93 is connected through the divider 99 to the register 100, and the register 100 output is connected to data lines of the processor 29.

The diagnostic system further includes a number of other engine sensors including a fuel pressure sensor 27 connected in the rail 17, a lubricant pressure sensor 46 connected in the rifle passage 42, and an intake manifold air pressure sensor 34 connected in the intake manifold. The sensors 51 and 61 are connected to a counter-timer module 22 and the sensors 27, 34 and 46 are connected to an A/D convertor 23, the components 22 and 23 being connected to control and data lines of the processor 29. The processor 29 provides outputs of a readout device 70 which may provide, for example, visual indications and permanent records.

Figure 2:
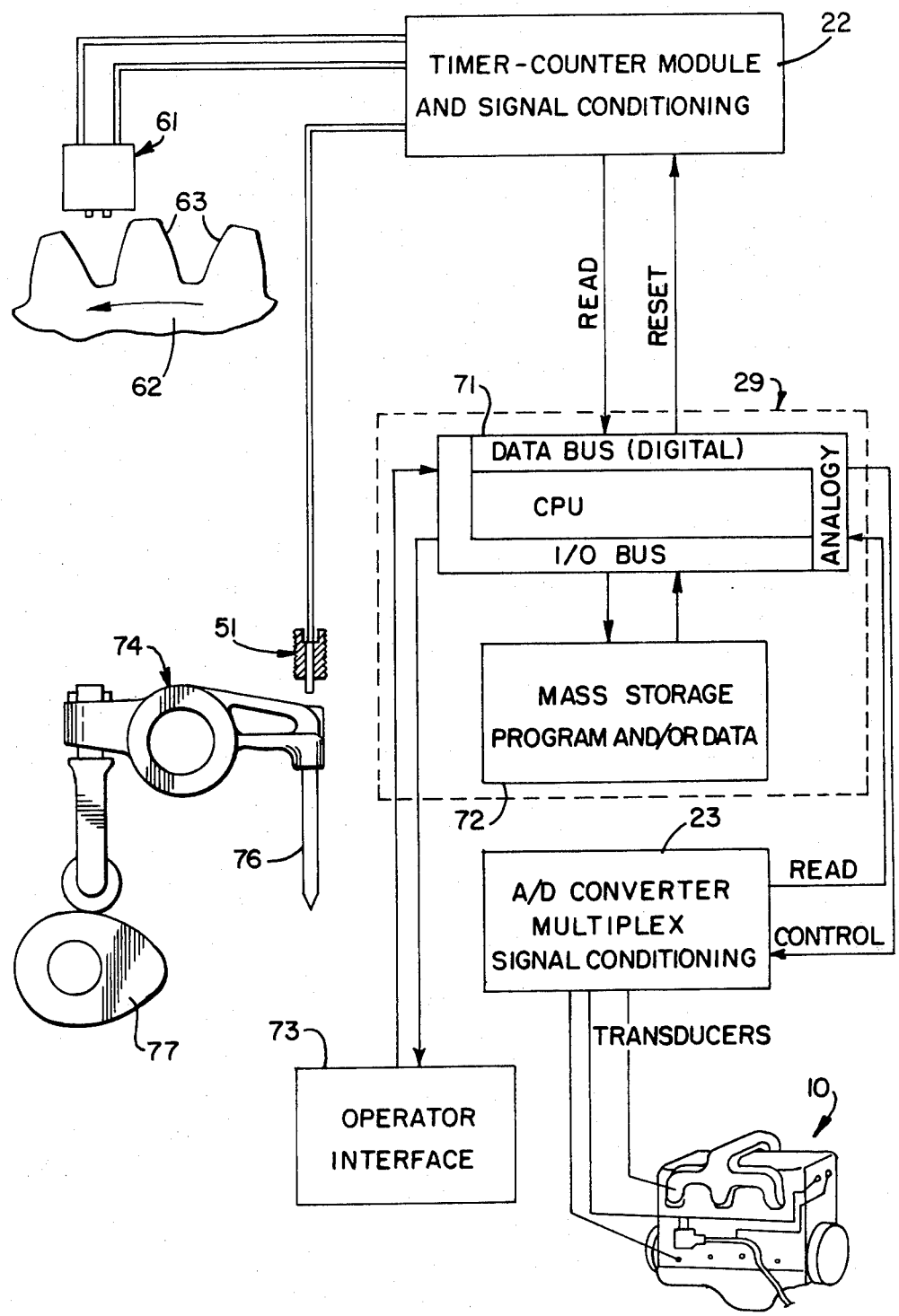
FIG. 2 is a block diagram showing the diagnostic system in greater detail.

FIG. 2 illustrates the diagnostic system in greater detail. The processor 29 includes a processing unit 71 and a memory unit 72. An operator interface 73 is connected to the unit 71 and forms means whereby the operator may insert information and instructions and includes the readout 70. The processor utilizes the signal from the CEM sensor 51 which is shown mounted in a position to sense the movement of a rocker arm 74 for an injector plunger 76. A cam 77 moves the plunger 76 in an injection stroke toward the end of the compression stroke.

The components 22, 23, 29 and 73 may comprise, for example, standard products of Texas Instruments Company.

FIG. 4 illustrates the variation in the engine torque output, at the crankshaft and the ring gear, for a six-cylinder four-stroke engine. The torque varies or fluctuates as shown about the mean absorbed torque with the engine operating at a steady speed. The crankshaft makes two complete revolutions for each engine cycle, and the firing interval of each cylinder is 120° long. Torque peaks 101 to 106 appear during the combustion strokes of the cylinders, and the relatively low peak 104 illustrates the characteristic of an underfueled cylinder. Top dead center (TDC) at the start of the combustion stroke of the number one cylinder is indicated by the number 108. If a cylinder firing interval is divided into three equal 40° segments, for a normal cylinder, about 52% of the total work is produced in the first segment and 87% of the total is produced by the end of the second segment. For a cylinder that is weak due to improper burning, for example, about 40% of the total work is produced during the first segment and 80% is produced by the end of the second segment.

FIG. 5 shows the torque output vs crank angle of a single cylinder over one firing interval, and illustrates the difference in torque between engine acceleration and deceleration. The acceleration curve 111 represents the condition when power is being generated as during a full open throttle and free engine acceleration, and shows the high peak torque caused by burning of fuel. The peak on the deceleration curve 112 is produced by the expansion of air in the cylinder without fuel combustion, as during deceleration when no power is being generated. The curve 112, particularly the shoulder 113 shows the effect of the compression in the next cylinder in the firing order and the inertia torques. Of course, if the compression and torque influences shown in curve 112 vary from cylinder to cylinder, the curve 111 would also vary and be an unreliable indication of power balance. Prior art systems based only on acceleration rate are not able to remove those factors from consideration.

When the deceleration curve 112 is subtracted from the acceleration curve 111, the torque or work output due to the combustion of fuel is derived for a single cylinder, and the torque for a normal cylinder over one cycle is represented by the curve 114 in FIG. 6. By subtracting the acceleration and deceleration curves to produce the curve 114, in accordance with this invention, a number of factors are eliminated, such as apparent speed variations due to ring gear faults, variations in the inertia of the rotating engine parts, variations in the compression work of the cylinders, and engine friction. The integral of the curve 114 thus represents the work produced by a single cylinder over one firing interval. The curve 116 is a similar curve but shows a deficient cylinder, and shows the lower work output or torque of a weak cylinder.

To determine the work produced by each cylinder in accordance with this invention, and thereby to determine the power balance of the cylinders, the speed signals from the sensor 61 and the CEM signals from the sensor 51 are transmitted to the processor 22 which operates in accordance with the Metacode shown in FIGS. 7-A to 7-S.

The Metacode is an abstracted flow chart of the steps to be executed by the processor; a complete program will be obvious to those skilled in the art from the Metacode and the present description. While the Metacode is a sufficient basis for the preparation of a program to carry out the invention, the following discussion is provided to aid in understanding the system and the Metacode.

Broadly, the present invention comprises measuring the instantaneous engine speed utilizing the sensor 61, the speed measurements being in terms of $\Delta t$ or the time interval for a tooth 63 to move from one element 91 to the other element 92. The angular distance, measured in ring gear teeth 63, from a CEM signal to the next subsequent TDC, and the angular distances between adjacent TDCs, are determined to identify the TDC locations. During an acceleration run from a selected speed, the time interval data are obtained for at least a full cycle of engine operation. A function representing the change in kinetic energy from each TDC location to the next subsequent TDC is determined by squaring the angular speeds at both TDC points and finding their difference. Similar time interval measurements at the same engine speed are made during deceleration, and the functions representing the energy over the firing intervals are determined. Then, for each firing interval, the change in kinetic energy on deceleration is subtracted from the change in kinetic energy on acceleration. This change in kinetic energy is related to the work done by the engine by the relationship $$\int_{\theta 1}^{\theta 2} Td\theta = \frac{1}{2} I(\omega_2^2 - \omega_1^2).$$

The work done during a firing interval is predominantly influenced by the combustion of fuel in the cylinder whose power stroke occurs during the firing interval being examined. The works for the various cylinders may then be compared or ranked to obtain the power balance.

The kinetic energy at any instant is a function of the angular speed of the crankshaft 66 and the ring gear 62. In a test of a free engine, that is where no torque (T) is externally absorbed by a dynamometer or other load, the torque fluctuation is represented by a variation in engine acceleration as related by the function $T=I\alpha$ where I is the inertia and $\alpha$ is the angular acceleration. In the method disclosed herein of measuring the engine speed, the sensor 61 and the related circuitry determine the time interval $\Delta t$ required for a tooth to move from one sensor element to the other. The time interval is an inverse function of ring gear angular velocity $\omega$ as follows:

$$\omega = K_1/\Delta t$$

The kinetic energy is $$KE = \frac{1}{2}I\omega^2$$

or where I is the engine inertia and $K_1$ is a constant.

Thus, the instantaneous engine speed is related to the instantaneous torque output and to the kinetic energy of the engine.

While the Metacode includes a number of definitions and comments, the following additional commentaries may be useful. CEMRK is produced by the sensor 51 which, in this example, produces a pulse just ahead of top-dead-center of the number one cylinder. The dual-pole sensor is the speed sensor 61. The variable DLTWSQ represents $\Delta\omega^2$ which is a function of the change in KE over an angular interval. TIMINT is a time interval $\Delta t$ reading from the dual-pole sensor. PZX stands for positive zero crossing. When the kinetic energy over an engine cycle is plotted vs. time, the point at which torque stops being absorbed (negative KE) and starts to be produced (positive KE) is marked by a zero crossing from negative to positive (PZX). This crossing substantially coincides with the top dead center (TDC) when compression ends and expansion begins. Thus the TDC location of each firing interval may be located by plotting the change in KE and identifying the positive zero crossings. The crossing data are stored in (ARRAY) PZX. The OFFSET means the distance, measured in ring gear teeth, from CEMRK to the next PZX (or TDC). As to PROBCAL, the RPM equals PROBCAL divided by $\Delta t$ and is a function of $X/2\pi R$ (see FIG. 3 for X and R).

FIG. 7-C shows the power balance routine. The operator is prompted to insert various information describing the engine under test. Certain data may be stored on a conventional media such as cassette tape or floppy disc. These data may be accessed according to an engine model number on code supplied by the operator. Thus the operator need not supply the detailed information needed to perform the test. NUMCYL means the number of engine cylinders and FIRORD means the firing order. The test to be performed is the power balance and one or more runs or samples may be made. As to the threshold values, in an acceleration run of the engine from, for example, 600 RPM to 2400 RPM, the time interval data for the power balance test may be collected at approximately 1000 RPM. An engine of the type previously described accelerates at the rate of about 200 RPM per engine cycle; consequently the threshold instantaneous speed to initiate data collection may be approximately 800 RPM. During the subsequent deceleration run, the threshold instantaneous speed may be set at about 1050 RPM in order to accumulate data at about 1000 RPM, because an engine decelerates much more slowly than it accelerates. The system then calls the SETUP subroutine (shown in FIG. 7-D) and then calls the EXPANSION subroutine (shown in FIG. 7-I). SUMINT means twice the number of teeth on the ring gear, that is, the number of teeth passing the sensor 61 in one full engine cycle.

In the SETUP subroutine (FIG. 7-D), LOSPEED indicates a threshold value such as 600 RPM. TIMINT readings are taken over at least an engine cycle and stored in a buffer. The gear tooth corresponding to the occurrence of the CEM mark is determined. The positive zero crossings, which correspond to the top-dead-centers, are determined and the corresponding gear teeth are identified. This information and the firing order enables the TDC locations to be identified in terms of ring gear teeth. These data are utilized in the power balance test as previously noted. The SETUP subroutine calls up a number of other subroutines which accomplish these steps and are shown in the drawings.

The ACQUIRE subroutine, (FIG. 7-F) acquires the $\Delta t$ values and the CEM values over at least one engine cycle, from the counters that receive the oscillator 86 cycles during the $\Delta t$ and the CEM time intervals. The CALIBRATE subroutine (FIG. 7-G) determines a factor used in determining RPM from the $\Delta t$ measurements. The SMOOTH subroutine (FIG. 7-H) smooths and edits the data to eliminate wild points, in accordance with standard techniques. The EXPANSION subroutine computes the work done during a firing interval, and in EXPWORK, the work during acceleration is subtracted from the work during acceleration for each interval. In the IDENTIFY subroutine (FIGS. 7-I and 7-K) the cylinders and their TDC locations are identified relative to the CEMRK. The commentaries for the subroutines of FIGS. 7-L to 7-Q describe the functions.

The operation of the system may again be briefly summarized as follows: The instantaneous speed data are accumulated in the form of time intervals $\Delta t$, the data being received from the sensor 61 and the counter timer 94. Other data are initially loaded into the system such as the number of points or $\Delta t$ measurements to be taken and the engine threshold speeds at which the measurements are to be taken. The values are stored in a buffer TIMINT which also receives the CEM signal. The buffer stores the Δt values, and it provides an index identifying the location of the Δt value that occurs at the same time as the CEM signal. The SETUP routine accumulates and processes the data in preparation for the acceleration and deceleration runs. The data in the TIMINT buffer are edited and smoothed using standard techniques. The instantaneous kinetic energy is computed from the inverse of $\Delta t^2$ values. The processor utilizes the CEM signal and the zero crossing data, and provides an identification of the cylinder top dead center next following the CEM signal. The offset is computed in ring gear teeth from a CEM signal to the next positive crossing (PZX or TCD). From the engine firing order and the total number of teeth on the ring gear the processor computes the number of ring gear teeth between TDCs, which is the interval between power strokes (INTBPS). Thus, the number of gear teeth from the CEM to the TDC of each cylinder is computed. The processor also computes the instantaneous engine RPM using the PROBCAL conversion factor.

After the data are accumulated during the acceleration run, the time interval measurements at the top dead centers of the cylinders are utilized to compute the change in kinetic energy from each TDC to the next TDC. Similarly, after the subsequent deceleration run, the changes in kinetic energy between TDCs are computed during deceleration. The kinetic energy changes are correlated with the associated cylinders or firing intervals, utilizing the OFFSET and the INTPBS data. Using the measurement for each cylinder or firing interval, the kinetic energy change during deceleration is subtracted from the kinetic energy change during acceleration, to produce the work of each cylinder. To compare the cylinders, the work values may be averaged and the average values of the cylinders may be ranked.

Instead of accumulating data in only one acceleration run and only one deceleration run, there may be a number of acceleration runs and the data averaged, and a number of deceleration runs and the data averaged.

The system may also provide for determination of the compression balance of the cylinders as shown by the routines of FIGS. 7-R and 7-S. The processor receives the time interval and the CEM signals, and the OFFSET and the INTBPS factors. A low threshold speed is set in it, which is below normal low idle speed. When the speed is sufficiently low and the fuel is cut off to produce deceleration at low speed, the variation in inertia forces between cylinders is small as compared to the gas forces, and consequently the kinetic energy change over a segment of a firing interval, such as 40°, preceeding TDC represents the compression work done on the gas. The processor receives the data, divides each firing interval into a number of segments, and computes the change in kinetic energy in each segment. There may be, for example, three equal 40° segments in each interval. The data for the segments just preceeding the top dead centers are compared and ranked in order to determine the relative work of compression for the cylinders.

It will be apparent from the foregoing that a novel and useful system has been provided for diagnosing the health of the cylinders of an engine. The system determines the power balances and is able to identify a weak cylinder, by sensing the kinetic energy of the engine. By this method, a number of factors that could lead to error are eliminated by the subtraction of the energy during deceleration from the energy during acceleration. The work from each cylinder is thus determined. It is preferred that the work be determined by first measuring the changes in kinetic energy over the firing intervals both on acceleration and deceleration and then taking the difference, because the method may be carried out in a straight forward manner as described. However, the invention is also broad enough to encompass other systems for measuring the work, such as by taking a number of readings at a number of angular positions over each interval both during acceleration and deceleration, correlating the readings at each angle, taking the difference at each angle, and computing the work from the differences. The system also provides for determining the compression balance by measuring the changes in kinetic energy over the part of each interval that just preceeds top-dead-center during the compression stroke.

When diagnosing power balance or compression balance, the values for the cylinders may be produced for evaluation by the system operator, or the processor may automatically rank the cylinders, or the values may be compared with acceptable reference values. Of course other calculations or tests may be performed based on the kinetic energy calculations.

We claim:

1. A method of diagnosing the performance of the cylinders of a multicylinder internal combustion engine, each of said cylinders having a firing interval and the intervals for all of said cylinders forming an engine cycle, said method comprising sensing the substantially instantaneous engine speed at a plurality of angularly spaced positions in the engine cycle, squaring said sensed speeds to obtain a function representing the engine kinetic energy at each of said angular positions, and for each firing interval obtaining the difference between the functions of the kinetic energy at two spaced angular positions.

2. The method of claim 1, wherein said two angular positions comprise the beginning and end of each of said firing intervals.

3. The method of claim 1, wherein each of said firing intervals includes a compression stroke, and said two angular positions occur during said compression stroke.

4. Apparatus as in claim 1, wherein said two angular positions comprise the beginning and end of each of said firing intervals.

5. Apparatus as in claim 1, wherein each of said firing intervals includes a compression stroke, and said two angular positions occur during said compression stroke.

6. A method for diagnosing the performance of the cylinders of a multicylinder internal combustion engine, each of said cylinders having a firing interval and the intervals for all of said cylinders forming an engine cycle, said method comprising sensing the instantaneous engine speed and marking a regularly recurring event in the engine cycle, operating the engine and squaring said engine speed to obtain changes in a function of the kinetic energy during an engine cycle and thereby to identify each of said firing invervals, correlating said identified firing intervals with said cylinders from said event marking, squaring said engine speed during a first operating condition of the engine to obtain the change in the function of the engine kinetic energy over each of said firing intervals, squaring said engine speed during a second operating condition of the engine to obtain the change in the functions of the engine kinetic energy over each of said firing intervals, and obtaining the differences between the first mentioned and second mentioned changes.

7. The method of claim 6, wherein the change in the function of kinetic energy for each of said cylinders is obtained.

8. The method of claim 7, wherein said first operating condition is an acceleration of the engine and said second operating condition is a deceleration of the engine, and said difference indicates the work during each firing interval.

9. A method of diagnosing the performance of the cylinders of a multicylinder internal combustion engine, each of said cylinders having a firing interval and the intervals for all of said cylinders forming an engine cycle, said method comprising sensing the substantially instantaneous engine speed at a plurality of angularly spaced positions in the engine cycle, squaring the engine speeds to obtain the change in a function of the kinetic energy over each of said firing intervals during a first operating condition of the engine, squaring the engine speeds to obtain the change in the function of the kinetic energy over each of said firing intervals during a second operating condition of the engine, and for each of said intervals determining the difference between the function of kinetic energy.

10. Apparatus for diagnosing the performance of the cylinders of a multicylinder internal combustion engine, each of said cylinders having a firing interval and the intervals for all of said cylinders forming an engine cycle, comprising speed sensing means for sensing the substantially instantaneous engine speed at a plurality of angularly spaced positions in the engine cycle, and processing means responsive to said speed sensing means for squaring the engine speeds to obtain the change in a function of the kinetic energy over each of said firing intervals during a first operating condition of the engine, for squaring the engine speeds to obtain the change in the function of the kinetic energy over each of said firing intervals during a second operating condition of the engine, and for each of said intervals determining the difference between the functions of the kinetic energy.

11. Apparatus as in claim 10 and further including means marking an event that occurs regularly in each of said engine cycles, and said processing means being responsive to said event marking means and to said speed sensing means for identifying said firing intervals.

12. Apparatus as in claim 11, wherein each of said cylinders and associated firing intervals has a top dead center position, and said processing means operates to identify said top dead center positions.

13. Apparatus as in claim 12, wherein said processing means computes the change in the function of the kinetic energy from each of said top dead center positions to the next subsequent of said top dead center positions.

14. Apparatus as in claim 10, wherein the engine includes a moving part having a plurality of spaced index points, and said speed sensing means includes two spaced sensing elements positioned adjacent said part, and circuit means connected to said sensing means for measuring the time interval for each of said index points to move from one of said elements to the other of said elements.

15. Apparatus as in claim 10, wherein said first operating condition comprises acceleration of the engine, and said second operating condition comprises deceleration of the engine.

16. Apparatus as in claim 15, wherein said functions of the kinetic energy changes during deceleration are subtracted from the functions of the kinetic energy changes during acceleration to obtain the work of each of said firing intervals.

17. Apparatus for diagnosing the performance of the cylinders of a multicylinder internal combustion engine, each of said cylinders having a firing interval and the intervals for all of said cylinders forming an engine cycle, said apparatus comprising means for sensing the substantially instantaneous engine speed at a plurality of angularly spaced positions in the engine cycle, means for determining functions of the engine by squaring the engine speed kinetic energy at each of said angular positions, and means for obtaining the difference between the functions of kinetic energies at two spaced angular positions for each firing interval.

18. A method for diagnosing the performance of the cylinders of a multicylinder internal combustion engine, each of said cylinders having a firing interval and the intervals for all of said cylinders forming an engine cycle, said method comprising sensing the instantaneous engine speed and marking a regularly recurring event in the engine cycle, operating the engine and processing said engine speed to obtain functions of the changes in kinetic energy during an engine cycle and thereby to identify each of said firing intervals, correlating said identified firing intervals with said cylinders from said event marking, processing said engine speed during a first operating condition of the engine to obtain the change in the function of the engine kinetic energy over each of said firing intervals by squaring said engine speeds, processing said engine speed during a second operating condition of the engine to obtain the change in the functions of the engine kinetic energy over each of said firing intervals by squaring said engine speeds, and obtaining the differences between the first mentioned and second mentioned changes.

19. Apparatus for diagnosing the power balance of the cylinders of a multicyclinder internal combustion engine, comprising
  speed sensor means responsive to the speed of the engine,
  cycle event sensor means responsive to an engine cycle event occurring during operation of the engine,
  processing means including means for determining the change in functions of the kinetic energy over each firing interval during acceleration of the engine by squaring the engine speeds, means for determining the change in the function of the kinetic energy over each of said firing intervals during deceleration of the engine by squaring the engine speeds, and means for determining the difference between the functions of the kinetic energies on acceleration and deceleration for each cylinder,
  and means responsive to said differences for indicating the power balance.

20. Apparatus as in claim 19, wherein said means for determining differences comprises means for subtracting the functions of the kinetic energy changes on deceleration from the functions of the kinetic energy changes on acceleration.

21. Apparatus as in claim 19, wherein said processing means determines the change in kinetic energy from a cycle event of each interval to the corresponding cycle event of another interval.

22. Apparatus as in claim 19, wherein said processing means further comprises means for computing the change in the function of the kinetic energy during a compression stroke segment of each firing interval during a deceleration cycle of the engine at a low speed.

23. The method of diagnosing the strengths of the cylinders of a multicylinder internal combustion engine, comprising the steps of:

sensing the instantaneous speed of the engine, computing the changes in functions of the kinetic energy from the square of engine speeds of the engine over the firing intervals of an operating cycle during an acceleration run of the engine, computing the changes in the functions of the kinetic energy from the square of engine speeds of the engine over the firing intervals of an operating cycle during a deceleration run of the engine, and subtracting the changes during the deceleration run from the changes during the acceleration run.

24. The method of claim 23, wherein said computation during said acceleration run is at substantially the same engine speed as the computation during the deceleration run.

25. The method of diagnosing the strength of the cylinders of a multicylinder internal combustion engine, comprising the steps of:

sensing the instantaneous speed of the engine, computing the changes in functions of the kinetic energy of the engine during an acceleration run for the firing intervals, computing the changes in functions of the kinetic energy of the engine during a deceleration run for the firing intervals, said computing including squaring the speed of the engine, correlating the changes in the functions during the deceleration run with the kinetic energy changes during the acceleration run, and for each firing interval substracting the change during said deceleration run from the change during the deceleration run.

* * * * *